United States Patent
Oobayashi et al.

(10) Patent No.: US 7,432,323 B2
(45) Date of Patent: Oct. 7, 2008

(54) POLYOLEFIN RESIN COMPOSITION

(75) Inventors: Yoshiaki Oobayashi, Ichihara (JP); Katsuhisa Kitano, Ichihara (JP); Kazunori Teraoka, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/226,267

(22) Filed: Sep. 15, 2005

(65) Prior Publication Data

US 2006/0074174 A1    Apr. 6, 2006

(30) Foreign Application Priority Data

Sep. 17, 2004   (JP) .............................. 2004-271231

(51) Int. Cl.
*C09B 67/00* (2006.01)

(52) U.S. Cl. ................. 524/502; 524/495; 524/411

(58) Field of Classification Search ............ 524/502, 524/495, 411

See application file for complete search history.

(56) References Cited

U.S. PATENT DOCUMENTS 6,569,950 B2    5/2003   Kitano et al.
6,774,185 B2 *  8/2004   Lin et al. .................. 525/191

FOREIGN PATENT DOCUMENTS

JP      06-279630 A     10/1994
JP      10-176085 A     6/1998

* cited by examiner

*Primary Examiner*—Robert D. Harlan
(74) *Attorney, Agent, or Firm*—Sughrue Mion, PLLC

(57) ABSTRACT

Disclosed is a polyolefin resin composition comprising 100 parts by weight of component (A), 0.001 to 10 parts by weight of component (B) and 0.01 to 100 parts by weight of component (C):

component (A): polyolefin resin;
component (B): carbon black which satisfies the following requirements (1) and (2):
requirement (1): containing a volatile component in an amount of less than 0.2% by weight as measured by the method provided in JIS K6221;
requirement (2): containing at least one element selected from the group consisting of iron, nickel, copper, cobalt, aluminum, manganese and vanadium in an amount, based on the weight of the carbon black, of 4 ppm or less;
component (C): stabilizer.

9 Claims, No Drawings

POLYOLEFIN RESIN COMPOSITION

BACKGROUND OF THE INVENTION

1. Field of the Invention

The present invention relates to a polyolefin resin composition and to a molded article obtained by molding the composition. More particularly, the invention relates to a polyolefin resin composition which has good appearance and excellent mechanical strength and, in addition, is superior in long-term durability of mechanical strength, for example, superior in thermal degradation resistance, light stability and copper-accelerated thermal degradation resistance which persist for a long term in the environment with influence of oxygen, heat and light. The invention also relates to a molded article obtained by molding the composition.

2. Description of the Related Art

Polyolefin resin is widely used as general purpose resin in various fields because it is superior in mechanical strength, heat resistance, mold ability, chemical resistance, etc and also because it is a relatively inexpensive polymeric material. In particular, replacement of polymeric materials such as ABS, nylon and polycarbonate, which have been used in the fields of automotive components and household electric appliances, by polyolefin resin, especially polypropylene resin has recently been going on.

As one example of polypropylene resin composition for use in the fields of automotive components and household electric appliances, Japanese Patent Application Publication No. 6-279630 discloses a colored polypropylene composition superior in heat aging resistance, namely, a heat aging resistant colored polypropylene composition comprising acetylene black or a perylene-based black pigment in polypropylene.

Japanese Patent Application Publication No. 10-176085 discloses a glass fiber-reinforced polypropylene resin composition having good appearance and moderate mechanical strength, specifically, a glass fiber-reinforced polypropylene resin composition comprising maleic anhydride-graft-modified propylene-based polymer and glass fiber treated with a silane coupling agent.

The polypropylene resin compositions disclosed in the publications of patent applications have appearance and mechanical strength improved to some extent. There, however, is a demand for further improvement in long-term durability of mechanical strength, for example, thermal degradation resistance, light stability and copper-accelerated thermal degradation resistance which persist for a long term, in the environment with influence of oxygen, heat and light.

SUMMARY OF THE INVENTION

Under such circumstances, the object of the present invention is to provide a polyolefin resin composition which has good appearance and excellent mechanical strength and, in addition, is superior in long-term durability of mechanical strength, for example, superior in thermal degradation resistance, light stability and copper-accelerated thermal degradation resistance for a long term in the environment with influence of oxygen, heat and light, and a molded article obtained by molding the composition.

The present Invention provides, in a first aspect, a polyolefin resin composition comprising component (A) defined below, 0.001 to 10 parts by weight, based on 100 parts by weight of component (A), of component (B) defined below and 0.01 to 100 parts by weight, based on 100 parts by weight of component (A), of component (C) defined below:

component (A): polyolefin resin, except polyolefin resin which has been graft-modified with a compound selected from the group consisting of unsaturated carbolic acids and their derivatives;

component (B): carbon black which satisfies requirements (1) and (2) defined below:

requirement (1): containing a volatile component in an amount of less than 0.2% by weight as measured by the method provided in JIS K6221;

requirement (2) ): containing at least one element selected from the group consisting of iron, nickel, copper, cobalt, aluminum, manganese and vanadium in an amount, based on the weight of the carbon black, of 4 ppm or less;

component (C): stabilizer.

The present invention provides, in a second aspect, a molded article obtained by molding the above-mentioned composition.

In this specification, the polyolefin resin which is component (A), the carbon black which is component (B) and the stabilizer which is component (C) are referred to as polyolefin resin (A), carbon black (B) and stabilizer (C), respectively.

According to the present invention, it is possible to obtain a polyolefin resin composition which has good appearance and excellent mechanical strength and, in addition is superior in long-term durability of mechanical strength, for example, superior in thermal degradation resistance, light stability and copper-accelerated thermal degradation resistance which persist for a long term in the environment with influence of oxygen, heat and light, and a molded article obtained by molding the composition.

DESCRIPTION OF THE PREFERRED EMBODIMENTS

Polyolefin resin (A) used in the present invention is a resin produced by polymerizing polymerizable monomer primarily comprising olefin monomer.

Examples of polyolefin resin (A) include olefin homopolymers and copolymers of two or more olefins, specifically polyethylene resin, polypropylene resin and polybutene resin. Polypropylene resin is preferred. It should be noted that polyolefin resin (A) used herein does not include polyolefin resin which has been graft-modified with a compound selected from the group consisting of unsaturated carboxylic acids and their derivatives.

Examples of the polyethylene resin include ethylene homopolymers and ethylene-α-olefin copolymers.

Specific examples of the α-olefin for use as a constituent of the ethylene-α-olefin copolymers include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene; 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, ethyl-1-hexene, dimethyl-1-hexena, propyl-1-heptene, methylethyl-1-heptene, trimethyl-1-pentene, propyl-1-pentene, diethyl-1-butene, 1-nonene, 1-decene, 1-undecene and 1-dodecene, Preferred are 1-butene, 1-pentene, 1-hexene and 1-octene.

Examples of the polypropylene resin include propylene homopolymers, propylene-ethylene random copolymers, propylene-α-olefin random copolymers, propylene-ethylene-α-olefin copolymers, and polypropylene copolymers composed of a propylene homopolymer component or copolymer component composed mainly of propylene (hereinafter, referred to as polymer component (I)) and a copolymer component composed of propylene and a comonomer selected from the group consisting of ethylene and α-olefins (hereinafter, referred to as copolymer component (II)). These polypropylene resins may be used solely or in combination.

The α-olefin to be used for forming the polypropylene resin is typically an α-olefin having from 4 to 12 carbon atoms, e.g. 1-butene, 1-pentene, 1-hexene, 4-methyl-1-pentene, I-octene and 1-decena. Preferred are 1-butene, 1-hexene and 1-octene.

Examples of the propylene-α-olefin random copolymers include propylene-1-butene random copolymers, propylene-1-hexene random copolymers and propylene-1-octene random copolymers.

Examples of the propylene-ethylene-α-olefin copolymers include propylene-ethylene-1-butene copolymers, propylene-ethylene-1-hexene copolymers and propylene-ethylene-1-octene copolymers.

Examples of the copolymer component composed mainly of propylene in polymer component (I) of the polypropylene copolymer composed of polymer component (I) and copolymer component (TI) include propylene-ethylene copolymer components, propylene-1-butene copolymer components, and propylene-1-hexene copolymer components. Examples of the copolymer component composed of propylene and a comonomer selected from the group consisting of ethylene and α-olefins (namely, copolymer component (II)) Include propylene-ethylene copolymer components, propylene-ethylene-1-butene copolymer components, propylene-ethylene-1-hexene copolymer components, propylene-ethylene-1-octene copolymer components, propylene-1-butene copolymer components, propylene-1-hexene copolymer components, and propylene-1-octene copolymer components.

The content of the comonomer selected from the group consisting of ethylene and α-olefins in copolymer component (II) is typically from 10 to 70% by weight.

Examples of the polypropylene copolymer composed of polymer component (I) and copolymer component (II) include (propylene) -(propylene-ethylene) copolymers, (propylene)-(propylene-ethylene-1-butene) copolymers, (propylene)-(propylene-ethylene-1-hexene) copolymers, (propylene)-(propylene-1-butene) copolymers, (propylene)-(propylene-1-hexene) copolymers, (propylene-ethylene) -(propylene-ethylene) copolymers, (propylene-ethylene)-(propylene-ethylene-1-butene) copolymers, (propylene-ethylene)-(propylene-ethylene-1-hexene) copolymers, (propylene-ethylene)-(propylene-1-butene) copolymers, (propylene-ethylene)-(propylene-1-hexene) copolymers, (propylene-1-butene)-(propylene-ethylene) copolymers, (propylene-1-butene)-(propylene-ethylene-1-butene) copolymers, (propylene-1-butane)-(propylene-ethylene-1-hexene) copolymers, (propylene-1-butane)-(propylene-1-butene) copolymers, and (propylene-1-butene)-(propylene-1-hexene) copolymers.

When polyolefin resin (A) is a polypropylene resin, the polypropylene resin is desirably a propylene homopolymer, a propylene-ethylene random copolymer, a propylene-1-butene random copolymer, a propylene-ethylene-1-butene copolymer or a (propylene)- (propylene-ethylene) copolymer.

When polyolefin resin (A) is a polypropylene resin, the crystallinity of the polypropylene resin may be determined appropriately according to the quality which the resin composition of the present invention or molded articles produced by molding the resin composition are required to have. An index of the crystallinity of the polypropylene resin is determined on the basis of the melting temperature (melting point), stereo regularity, or the like. The stereo regularity is popularly known as isotactic index and syndiotactic index. A polypropylene resin with a high isotactic index is called isotactic polypropylene; whereas a polypropylene resin with a high syndiotactic index is called syndiotactic polypropylene.

The isotactic Index is a fraction of isotactic chains in the form of pentad unit in a polypropylene molecule chain, in other words, a fraction of propylene monomer units existing in the center of a chain In which five propylene monomer units are meso-bonded, measured by a method using $^{13}$C-NMR described by A. Zambelli, et al. in Macro molecules, 6, 925 (1973). The fraction is called isotactic pentad fraction and it is expressed by [mmmm]. The assignment of absorption peaks in an NMR spectrum is carried out according to the article of Macromolecules 8, 687 (1975). Specifically, the isotactic index of a polypropylene resin can be determined as an area fraction of mmmm peaks in all the absorption peaks in the methyl carbon region of a $^{13}$C-NMR spectrum. A polypropylene resin with a small isotactic index has a low crystallinity, whereas that with a high isotactic index has a high crystallinity.

The syndiotactic index is determined with reference to articles disclosed by J. A. Ewen, R. L. Jones and A. Razavi in J. Am. Chem, Soc., 110, 6255 (1988) and Angew. Chem. Int. Ed. Engl. 1955, 34, 1143-1170. A polypropylene resin with a small syndiotactic index has a low crystallinity, whereas that with a high syndiotactic index has a high crystallinity.

Polyolefin resin (A) may be produced by a process using a known polymerization catalyst and a known polymerization method. Examples of the polymerization catalyst include Ziegler type catalysts and Ziegler-Natta type catalysts. Other available catalysts include catalyst systems comprising a Group IV transition metal compound having a cyclopentadienyl ring and an alkylaluminoxane, catalyst systems comprising a Group IV transition metal compound having a cyclopentadienyl ring, a compound capable of reacting with the transition metal compound to form an ionic complex and an organoaluminum compound, and supported catalyst systems in which the preceding catalysts have been supported on inorganic particles or the like.

Examples of the polymerization method include slurry polymerization and solvent polymerization using an inert hydrocarbon solvent, liquid phase polymerization and vapor phase polymerization using no solvent, and vapor phase-vapor phase polymerization or liquid phase-vapor phase polymerization in which liquid phase polymerization and/or vapor phase polymerization are carried out successively. These polymerization methods may be carried out either batch wise or continuously. Polyolefin resin (A) may be produced either in a single step or in multiple (two or more) steps, in particular, polypropylene copolymers composed of polymer component (I) and copolymer component (II) is preferably produced by a method comprising multiple steps including at least two steps of producing polymer component (I) and producing copolymer component (II).

The melt flow rate (MFR) of polyolefin resin (A) is from 0.01 to 400 g/10 min. If the MFR is over 400 g/10 min, mechanical strength may deteriorate. From the viewpoints of mechanical strength and production stability, the MFR is preferably from 1 to 400 g/10 min, more preferably from 5 to 200 g10 min, and even more preferably from 10 to 150 g/10 mine The MFR is determined at 230° C. under a load of 21.2 N in accordance with ASTM D1238.

Carbon black (B) for use in the present invention is carbon black which satisfies requirements (1) and (2) defined below:

requirement (1): containing a volatile component in an amount of less than 0.24 by weight as measured by the method provided in JIS K6221;

requirement (2): containing at least one element selected from the group consisting of iron, nickel, copper, cobalt, aluminum, manganese and vanadium in an amount, based on the weight of the carbon blacks, of 4 ppm or less;

The contents of elements may be determined by the ICP emission spectrometry (inductively coupled high-frequency plasma emission spectrometry).

If requirement (1) is not satisfied, in other words, if the content of volatile matter contained in the carbon black is 0.2% or more, or if requirement (2) is not satisfied, in other words, if none of the elements, iron, nickel, copper, cobalt, aluminum, manganese and vanadium, is contained or the content of these elements is over 4 ppm, the long-term durability, for example, thermal degradation resistance, light stability and copper-accelerated thermal degradation resistance which persist for a long term, of the polyolefin resin composition or a molded article obtained therefrom may be insufficient.

Carbon black (B) may be furnace black, channel black, acetylene black, lamp black, etc.

The content of carbon black (B) is from 0.001 to 10 parts by weight, preferably from 0.001 to 5 parts by weight, and more preferably from 0.001 to 2 parts by weight per 100 parts by weight of polyolefin resin (A).

When the content of carbon black (B) is within the ranges mentioned above, it is possible to obtain a desired hue of products without deteriorating the performance of polyolefin resin (A). Inclusion of carbon black (B) in a content of less than 0.001 part by weight leads to poor colorability, which may not result in products with favorable appearance. On the other hand, inclusion of carbon black (B) in a content of over 10 parts by weight will lead to saturation of the effect caused by the inclusion of carbon black (B) and, therefore, it will only result in bad economy.

When carbon black (B) is combined with polyolefin resin (A), carbon black (H) may be mixed with polyolefin resin (A) directly. Alternatively, carbon black (B) maybe combined with polyolefin resin (A) by use of a processed pigment which is described below, for the purpose of facilitating and maintaining the dispersion of carbon black (B) and thereby introducing carbon black (B) into polyolefin resin (A) smoothly.

The processed pigment used herein is a material prepared by mixing or kneading carbon black (B) and a dispersing agent by means of a mixer such as super mixer, tumbler and heat rolls. Preferable examples of the dispersing agent include wax, modified wax, metal soap, low molecular weight polyethylene and low molecular weight polypropylene. A single dispersing agent may be use. Alternatively, two or more dispersing agent may be used in combination. The dispersing agent may contain a plasticizer.

Another way to combine carbon black (B) with polyolefin resin (A) is to prepare a master batch through dilution of the processed pigment with a vehicle and then mix the masterbatch into polyolefin resin (A).

The vehicle used herein is preferably a polyolefin resin, more preferably a polyolefin resin which has a melting temperature lower than that of the polyolefin resin (A) used and exhibits, in the molten state a viscosity lower than the viscosity of molten polyolefin resin (A).

The masterbatch may be prepared by heating and melt-kneading the processed pigment and the vehicle by means of a single or twin screw extruder, a Banbury mixer, a kneader or the like.

The content of carbon black (B) contained in the masterbatch may be determined arbitrarily, but it is typically from 10 to 70% by weight, preferably from 10 to 50% by weight, and more preferably from 10 to 30% by weight, based on the overall weight (100% by weight) of the masterbatch.

Colorants other than carbon black may be used in the present invention. Colorants which are conventionally used are available, such as inorganic pigments and organic pigments. Examples of the inorganic pigments include iron black, burnt ocher, titanium oxide, cadmium red, cadmium yellow, zincoxide, permanent blue, cobalt blue, calcium carbonate, titanium yellow, white lead, red lead, lead yellow and Berlin blue. Examples of the organic pigments include quinacridon, polyazo yellow, anthraquinon yellow, polyazo red, azo lake yellow, perylene, phthalocyanine green, phthalocyanine blue, and isoindolinone yellow. These colorants may be used solely or in combination.

The stabilizer (C) used in the present invention is a compound or material which is capable of preventing polyolefin resin from decomposition or degradation caused by oxygen, heat, ultra-violet ray, ozone or other oxidizing substances, mechanical stress or the like. Specific examples include neutralizing agent, antioxidant, light stabilizer, and metal deactivator. These may be used solely or in combination.

As the neutralizing agent, agents conventionally used are available, such as metal soaps of higher fatty acids and hydrotalcites.

Examples of the metal soaps of higher fatty acids include calciummyristate, calcium stearate, calcium palmitate, calcium 12-hydroxystearate, magnesium mtyristate, magnesiumn stearate, magnesium palmitate, magnesium 12-hydroxystearate, lithium myristate, lithium stearate, lithium palmitate, lithium 12-hydroxystearate, zinc myristate, zinc stearate, zinc palmitate, zinc 12-hydroxystearate, aluminum myristate, aluminum stearate, aluminum palmitate and aluminum 12-hydroxystearate.

The hydrotalcites used herein are anion-exchangeable laminar compounds represented by the following formula (I):

$$[M^{2+}_{1-X}M^{3+}_X(OH)_2]^{X+}[A^{n-}_{X/n} \cdot mH_2O]^{X-} \quad (I)$$

In the formula, $[M^{2+}_{1-X}M^{3+}_X(OH)_2]^{X+}$ is a base layer and $[A^{n-}_{X/n} \cdot mH_2O]^{X-}$ is an intermediate layer. $M^{2+}$ is a bivalent metal cation such as $Mg^{2+}$, $Mn^{2+}$, $Fe^{2+}$, $Co^{2+}$, $Ni^{2+}$, $Cu^{2+}$ and $Zn^{2+}$. $M^{3+}$ is a trivalent metal cation such as $Al^{3+}$, $Fe^{3+}$, $Cr^{3+}$, $Co^{3+}$ and $In^{3+}$. $A^{n-}$ is an n-valent anion such as $OH^-$, $F^-$, $Cl^-$, $Br^-$, $NO_3^-$, $CO_3^{2-}$, $SO_4^{2-}$, $Fe(CN)_6^{3-}$, $CH_3COO^-$, oxalate ion and salicylate ion. n is a positive integer. X satisfies $0<X\leqq0.33$ and m is a positive number.

The hydrotalcites may be either natural minerals or synthetic products. The crystal structures, crystal particle sizes and water contents of the hydrotalcites may be determined appropriately depending on the physical properties of the polyolefin resin composition of the present invention or molded articles produced therefrom are required to have. If desired, the hydrotalcites may be subjected to surface treatment.

Among the hydrotalcites represented by formula (I), preferred are hydrotalcites represented by the following formula (II):

$$Mg_XAl_2(OH)_{2Y+4}CO_3 \cdot mH_2O \quad (II)$$

where Y satisfies $Y\geqq4$ and m is a positive number.

More preferred are those represented by formula (I) wherein $M^{2+}$ is composed of one sort of $Mg^{2+}$, $Zn^{2+}$ or two sorts of bivalent metal cation. More preferred are hydrotalcites listed below.

Mg$_{4.5}$Al$_2$(OH)$_{13}$CO$_3$·3H$_2$O
Mg$_{4.5}$Al$_2$(OH)$_{13}$(CO3)$_{0.8}$·O$_{0.2}$
Mg$_4$Al$_2$(OH)$_{12}$CO$_3$·3H$_2$O
Mg$_5$Al$_2$(OH)$_{14}$CO$_3$·4H$_2$O
Mg$_6$Al$_2$(OH)$_{16}$CCO$_3$·4H$_2$O (natural mineral)
Zn$_4$Al$_2$(OH)$_{12}$CO$_3$·mH$_2$O (m is from 0 to 4)
Mg$_3$ZnAl$_2$(OH)$_{12}$CO$_3$·mH$_2$O (m is from 0 to 4)

Neutralizing agents of high dispersibilities are preferred. From the view point of impact resistance, the average particle diameter thereof is preferably from 0.01 to 10 μm, more preferably from 0.01 to 5 μm, and even more preferably from 0.01 to 1 μm. These neutralizing agents may be used solely or in combination.

As the antioxidant, conventional antioxidants may be used, such as phenol antioxidants, phosphorus-containing antioxidants, sulfur-containing antioxidants, hydroxylamine antioxidants and benzofuranone compounds.

Examples of the phenol antioxidants include 2,6-di-tert-butyl-4-methylphenol, tetrakis[methylene-3(3',5'-di-tert-butyl-4-hydroxyphenyl)propionate]methane, octadecyl 3-(3,5-di-tert-butyl-4-hydroxyphenyl)propionate, 3,9-bis[2-(3-(3-tert-butyl-4-hydroxy-5-methylphenyl) propionyloxy)-1,1-dlmethylethyl]-2,4,8,10-tetraoxaspiro [5.5]undecane, (2,4,6-trioxo-1,3,5-triazine-1,3,5(2H,4H,6H)-triyl)triethyl ene tris (3-(3,5-di-tert-butyl-4-hydroxyphenyl)propionate), 1,3,5-trimethyl-2,4,6-tris(3,5-di-tert-butyl-4-hydroxybenzyl) benzene, tris(3,5-di-tert-butyl-4-hydroxybenzyl) isocyanurate, 1,3,5-tris(4-tert-butyl-3-hydroxy-2,6-dimethylbenzyl) isocyanurate, pentaerythrityl tetrakis[3-(3,5-di-tert-butyl-4-hydroxyphenol)propionate], triethylene glycol-N-bis-3-(3-tert-butyl-5-methyl-4-hydroxy)phenyl) propionate, 1,6-hexanediol bis[3-(3.5-di-tert-butyl-4-hydroxyphenyl) propionate], 2,2-thiobis-diethylenebis[3-(3,5-di-tert-butyl-4-hydroxyphenyl) propionate], 2,2'-methylene-bis-(4-methyl-6-tert-butylphenol), 2,2'-methylene-bis-(4-ethyl-6-tert-butylphenol), 2,2'-methylene-bis-(4,6-di-t-butylphenol), 2,2'-ethylidene-bis-4,6-di-tert-butylphenol) (Cheminox 1129), 2,2'-butylidene-bis-(4-methyl-6-tert-butylphenol), 4,4'-butylidene bis(3-methyl-6-tert-butylphenol). 2-tert-butyl-6-(3-tert-butyl-2-hydroxy-5-methylbenzyl)-4-methylphenyl acrylate, 2,4-ci-tert-amyl-6-(1-(3.5-di-tert-amyl-2-hydroxyphenyl)ethyl)phenyl acrylate and tocopherols.

Specific examples of the tocopherols include α-tocopherol (5,7,8-trimethyltocol), β-tocopherol (5,8-dimethyltocol), γ-tocopherol (7,8-di-methyltocol), δ-tocopherol (8-methyltocol), and mixtures of two or more of them. In particular, vitamin E, which is α-tooopherol, is preferable. It is desirable that tocopherols have purities as high as possible. Specifically, preferred are tocopherols having a purity of 90% or more, more preferably 95% or more.

Particularly preferable phenol antioxidants are tetrakis [methylene-3(3',5'-di-tert-butyl-4-hydroxyphenyl)propionate]methane, octadecyl-3-(3,5-di-tert-butyl-4-hydroxyphenyl)propionate, 3,9-bis[2-{3-(3-tert-butyl-4-hydroxy-5-methylphenyl) propionyloxy}-1,1-dimethylethyl]-2,4,8,10-tetraoxaspiro [5.5]undecane, ethylenebis(oxyethylene)bis-(3-(5-tert-buthyl-4-hydroxy-m-tolyl)-propionate, 1,6-hexanediol bis[3-(3,5-di-tert-butyl-4-hydroxyphenyl) propionate], 2,2-thiobis-diethylenebis[3-(3,5-di-tert-butyl-4-hydroxyphenyl) propionate] and α-tocopherol.

Examples of the phosphorus-containing antioxidant include tris (nonylphenyl) phosphite, tris (2,4-di-tert-butylphenyl)phosphite, distearyl pentaerythritol diphosphite, bis(2,4-di-tert-butylphenyl)pentaerythritol diphosphite, bis (2,4-di-tert-butyl-6-methylphenyl)pentaerythritol diphosphite, bis(2,6-di-tert-butyl-4-methylphenyl)pentaerythritol diphosphite, bis(2,4-dicumylphenyl) pentaerythritol diphosphite, tetrakis(2,4-di-tert-butylphenyl)-4,4'-diphenylenediphosphonite, 2,2'-methylenebis(4.6-di-tert-butylphenyl) 2-ethylhexylphosphite, 2,2'-ethylidene bis(4,6-di-tert-butylphenyl)fluorophosphite, bis(2,4-di-tert-butyl-6-methylphenyl)ethylphosphlte, 2-(2,4,6-tri-tert-butylphenyl)-5-ethyl-5-butyl-1,3,2-oxaphosphorinane, 2,2',2"-nitrilo [triethyl-tris(3,3',5,5'-tetra-tert-butyl-1,1'-biphenyl-2,2'-diyl) phosphite, and 2,4,8,10-tetra-tert-butyl-6-[3-(3-methyl-4-hydroxy-5-tert-butylphenyl)propoxy]dibenzo[d,f][1,3,2] dioxaphosphepin.

Examples of the sulfur-containing antioxidant include dilauryl 3,3'-thiodipropionate, tridecyl 3,3'-thiodlpropionate, dimyristyl 3,3'-thiodipropionate, distearyl 3,3-thiodipropionate, laurylstearyl 3,3-thiodipropionate, neopentantetrayl tetrakis(3-laurylthiopropionate) and bis[2-methyl-4-(3-n-C12-14 alkyl)thiopropionyloxy)-5-tert-butylphenyl]sulfide.

Examples of the hydroxylamine antioxidant are hydroxylamine compounds represented by the following formula

(III)

wherein R$^1$ and R$^2$ each represent an alkyl group having from 12 to 30 carbon atoms.

The hydroxylamine compounds represented by formula (III) are compounds which are capable of forming a nitroxyl radical in the course of a degradation reaction of polymeric materials such as polyolefin resin caused by heat, oxygen, etc. and thereby inhibiting the thermal oxidative degradation of the polymeric materials.

R$^1$ and R$^2$ in formula (III), which represents a hydroxylamine compound, are each an alkyl group having from 12 to 30 carbon atoms. R$^1$ and R$^2$ may be either the same or different. The alkyl group is preferably a linear alkyl group or an alkyl group having a cycloalkyl group as a substituent. The number of carbon atoms constituting the alkyl group is preferably from 12 to 22. R$^1$ and R$^2$ are each preferably a linear saturated alkyl group having from 12 to 22 carbon atoms.

Examples of the linear saturated alkyl group include a tridecyl group, a tetradecyl group, a pentadecyl group, a hexadecyl group, a heptadecyl radical, an octadecyl group, a nonadecyl group, an eicosyl group, a heneicosyl group, a docosyl group, a tricosyl group and tetracosyl group. Preferred are a tetradecyl group, a hexadecyl group, an octadecyl group, an eicosyl group and a docosyl group.

Examples of the benzofuranone compound include 5,7-di-tert-butyl-3-(3,4-dimethylphenyl)-3H-benzofuran-2-one, 5,7-di-tert-butyl-3-(3,5-dimethylphenyl)-3H-benzofuran-2-one, 5,7-di-tert-butyl-3-(3,4,5-trimethylphenyl)-3H-benzofuran-2-one, 5,6,7-di-tert-butyl-3-(3,4-dimethylphenyl)-3H-benzofuran-2-one, 5,7-di-tert-butyl-3-(4-methylphenyl)-3H-benzofuran-2-one, 5-tert-butyl-3-(3,4-dimethylphenyl)-3H-benzofuran-2-one, 5,7-di-tert-butyl-3-(3,4-dimethylphenyl)-3H-benzofuran-2-one, 5,7-dimethyl-3-(3,4-dimethylphenyl)-3H-benzofuran-2-one, 5,7-dimethyl-3-(3,5-di-tert-butylphenyl)-3H-benzofuran-2-one, 5,7-di-tert-butyl-3-(3,5-di-tert-butylphenyl)-3H-benzofuran-2-one, 5,7-di-tert-pentyl-3-(3,5-dimethylphenyl)-3H-benzofuran-2-one, 5,7-di-tert-pentyl-3-(3,5-dipentylphenyl)-3H-benzofnran-2-one and 5,7-di-tert-butyl-3-(3,4-dioctylphenyl)-3H-benzofuran-2-one. Preferred is 5,7-di-tert-butyl-3-(3,4-dimethylphenyl)-3H-benzofuran-2-one. These antioxidants may be used solely or In combination.

As the light stabilizer, conventional light stabilizers may be used, such as hindered amine type light stabilizers. Light stabilizers may be used either solely or in combination.

Hindered amine light stabilizers are light stabilizers having a 2,2,6,6-tetramethylpiperidine skeleton in their molecules and having a role of scavenging radicals generated by light (ultraviolet rays) or inhibiting the degradation of polymeric materials such as polyolefin resin caused by decomposition of hydroperoxides.

Examples of the hindered amine light stabilizer include bis(2,2,6,6-tetramethyl-4-piperidyl) sebacate, a mixture of bis(1,2,2,6,6-pentamethyl-4-piperidyl) sebacate and 1.2,2 $_1$6,6-pentamethyl-4-piperidyl sebacate, bis(1,2.2,6,6-pentamethyl-4-piperidyl) [[3,5-bis(1,1-dimethylethyl)-4-hydroxyphenyl]methyl]butyl malonate, products resulting from a reaction between bis(2,2,6,6-tetramethyl-1(octyloxy)-4-piperidyl) decanedioate and 1,1-dimethylethyl hydroperoxide with octane, 4-benzoyloxy-2,2,6-6-tetramethylpiperidine, ester prepared from 2,2, 6, 6-tetramethyl-4-piperidinol and a higher fatty acid. tetrakis(2,2,6,6-tetramethyl-4-piperidyl) 1,2,3,4-butanetetracarboxylate, tetrakis(1,2,2,6,6-pentamethyl-4-piperidyl)-1,2,3,4-butanetetracarboxylate, polycondensates of dimethyl succinate with 4-hydroxy-2,2,6,6-tetramethyl-1-piperidine ethanol, poly[(6-(1,1,3,3-tetramethylbutyl)amtno-1,3,5-triazin-2,4-diyl){(2,2,6,6-tetramethyl-4-piperidyl)imino)hexamethylene (2,2,6,6-tetramethyl-4-piperidyl)imino}]. [1,6-hexanediamine. N,N'-bis(2,2,6,6-tetramethyl-4-piperidinyl)-polymer with 2,3,6-trichloro-1,3,5-triazine, reaction products with, N-butyl-1-butanamine and N-butyl-2,2,6,6-tetramethyl-4-piperidine], N,N',N'', N'''-tetrakis(4,6-bis(butyl-(N-methyl-2,2,6,6-tetramethylpiperidine-4-yl)imino)triazin-2-yl)-4,7-diazadecane-1,10-diamine, and mixed {1,2,2,6,6-pentamethyl-4-piperidyl/β,β,β',β'-tetramethyl-3,9-[2,4,8,10-tetraoxaspiro(5,5)undecane]diethyl}-1,2,3,4-butanetetracarboxylate.

Preferable hindered amine light stabilizers are bis(2,2,6,6-tetramethyl-4-piperidyl) sebacate, tetrakis(2,2,6,6-tetramethyl-4-piperidyl) 1,2,3,4-butanetetraoarboxylate, tetrakis(1,2,2,6,6-pentamethyl-4-piperidyl) 1,2,3,4-butanetetracarboxylate, products resulting from a reaction between bis(2,2,6,6-tetramethyl-l(octyloxy)-4-piperidyl) decanedioate and 1,1-dimethylethyl hydroperoxide with octane, polycondensates of dimethyl suceinate with 4-hydroxy-2,2,6,6-tetramethyl-1-piperidine ethanol, and poly [{6-(1,1,3,3-tetramethylbutyl)imino-1,3,5-triazin-2,4-diyl){(2,2,6.6-tetramethyl-4-piperidyl)imino}hexamethylene{(2,2,6,6-tetraznethyl-4-piperidyl)imino}].

As the metal deactivator, conventional metal deactivators may be used. Examples thereof include the benzotriazole derivatives disclosed in "New Development of Polymer Additives", pp. 76-85, published by The Nikkan Kogyo Shimbun, Ltd. and Japanese Patent Application Publication No. 8-302331, compounds having one or more groups represented by —CO—NH— (e.g. oxalic acid derivatives, salicylic acid derivatives, hydrazide derivatives and hydroxybenzoic acid annelid derivatives), and sulfur-containing phosphates.

Among these preferred are benzotriazole, 2,4,6-triamino-1,3,5-triazine, 3,9-bis[2-(3,5-diamino-2,4,6-triazaphenyl) ethyl]-2,4,8,10-tetraoaspiro[5.5]undecane, ethylenediamine-tetraacetic acid. alkali metal (Li, Na, K) salts of ethylenediamine-tetraacetic acid, N,N'-disalicylidene-ethylenediamine, N,N'-disalicylidene-1,2-propylenediamine, N,N''-disalicylidene-N'-methyl-dipropylenetriamine, 3-(N-salicyloyl)imino-1,2,4-triazole, decamethylene dicarboxylic acid- bis(N'-salicyloylhydrazide), nickel-bis(1-phenyl-3-methyl-4-decanoyl-5-pyrazolate), 2-ethoxy-2 '-ethyloxanilide, 5-tert-butyl-2-ethoxy-2'-ethyloxanilide, N,N-diethyl-N',N'-diphenyloxamide, N,N'-diethyl-N,N'-diphenyloxamide, oxalyl bis(benzylidenshydrazide), thiodipropionic acid-bis (benzylidenehydrazide), isophthalic acid-bis(2-phenoxypropionylhydrazide), bis(salicyloyl hydrazine), N-salicylidene-N'-salicyloyl hydrazone, 2',3-bis[[3-[3,5-di-tert-butyl-4-hydroxyphenyl]propionyl)]propionohydrazide, tris[2-tert-butyl-4-thio(2'-methyl-4'-hydroxy-5'-tert-butyl)phenyl-5-methyl]-phenyl phosphite, bis[2-tert-butyl-4-thio(2'-methyl-4'-hydroxy-5'-tert-butylphenyl)-5-methylphenyl]-pentaerythritol-diphosphite, tetrakis[2-tert-buty1-4-thio(2'-methyl-4'-hydroxy-5'-tert-butylphenyl)-5-methylphenyl]-1,6-hexamethylene-bis(N-hydroxyethyl-N-methylsemicarbazide)-diphosphite. tetrakis(2-tert-butyl-4-thio(2'-methyl-4'-hydroxy-5'-tert-butylphenyl)-5-methylphenyl]-1,10-decamethylene-dicarboxylic acid-dihydroxyethylcarbonylhidrazide-diphosphite, tetrakis[2-tert-butyl-4-thio(2'-methyl-4'-hydroxy-5'-tert-butylphenyl)-5-methylphenyl]-1,10-decamethylene-di-carboxylic acid-disalicyloylhidrazide-diphosphite, tetrakis[2-tert-butyl-4-thio (2'-methyl-4'-hydroxy-5'-tert-butylphenyl)-5-methylphenyl]-di(hydroxyethylcarbonyl)hydrazide-diphosphite, tetrakis[2-tert-butyl-4-thio(2'-methyl-4'-hydroxy-5'-tert-butylphenyl)-5-methylphenyl]-N,N'-bis (hydroxyethyl)oxamide-diphosphite, 2,2'-oxamide bis [ethyl-3-(3,5-tert-butyl-4-hydroxyphenyl)propionate].

The metal deactivator is more preferably one or more compounds selected from the group consisting of compounds having one or more groups represented by —CO—NH— (e.g. oxalic acid derivatives, salicylic acid derivatives and hydrazide derivatives) and sulfur-containing phosphates. Still more preferred area compounds described below (compounds 1-6). These metal deactivators maybe used either solely or in combination. (compound 1) ADK STAB CDA-1 and CDA-1M made of Asahi Denka Co., Ltd.: 3-(N-salicyloyl)imino-1,2,4-triazole, (compound 2) ADK STAB CDA-6 made of Asahi Denka Co., Ltd.: decamethylene dicarboxylic acid-bis(N'-salicyloylhydrazide).

(compound 3) Eastman Inhibitor OABU made of Eastman Chemical Co.: Oxalyl bis(benzylidenehydrazide), (compound 4) Irganox MD1024 made of Ciba Specialty Chemicals: 2',3-bis[[3-[3,5-di-tert-butyl-4-hydroxyphenyl] propionyl]]propionohydrazide, (compound 5) Naugard XL-1 made by Shiraishi Calcium Kaisha Ltd.: 2,2'-oxamide bis[ethyl 3-(3,5-tert-butyl-4-hydroxyphenyl)propionate], (compound 6) Hostanox OSP-1 made of Clariant(Japan) K.K.: tris[2-tert-butyl-4-thio(2'-methyl-4'-hydroxy-5'-tert-butyl)phenyl -5-methyl]-phenyl phosphate.

Stabilizer (C) used in the present invention may be in powdery or, alternatively, granular form prepared by mixing Individual stabilizers to be used. In use of granular stabilizer, the particle diameter thereof is preferably from 0.3 to 10 mm.

The content of stabilizer (C) used in the present invention is from 0.01 to 100 parts by weight, preferably from 0.01 to 50 parts by weight, more preferably from 0.03 to 10 parts by weight, and even more preferably from 0.03 to 5 parts by weight per 100 parts by weight of polyolefin resin (A). If the content of component (C) is less than 0.01 part by weight, the durability of mechanical strength may be insufficient, whereas if the content is over 100 parts by weight, the effect caused by the inclusion of component (C) will be saturated and, therefore, it will only result in bad economy.

The filler, which is component (D) used in the present invention and is referred hereinafter to as filler (D), is a material capable of enhancing the mechanical strength of polyolefin resin (A). Examples of the filler include glass flake, mica, glass powder, glass beads, talc, clay, alumina, silica, wollastonite, kaolin, bentonite, calcium silicate, aluminum silicate, sand, diatom earth, titanium oxide, iron oxide, aluminumoxide, calcium oxide, magnesium oxide, antimony oxide, barium ferrite, strontium ferrite, beryllium oxide, pumice, calcium hydroxide, magnesium hydroxide, aluminum hydroxide, basic magnesium carbonate, calcium carbonate, magnesium carbonate, dolomite, dawsonite, calcium sulfate, magnesium sulfate, calcium sulfite, carbon black, molybdenum sulfide, magnet powder, cadmium sulfide, whisker, wood flour, bamboo powder, melamine powder and complex hydroxide chloride such as hydrotalcite. Filler may be used solely or in combination.

Filler (D) may have been surface-treated with a surface-treating agent such as wax, fatty acid and silane coupling agent.

The form and size of filler (D) for use in the present invention may be chosen appropriately depending on the purpose of the use thereof.

From the viewpoint of reinforcing effect, filler (D) is preferably fiber. Examples of the fiber include glass fiber, carbon fiber, polyester fiber, metal fiber, aramid fiber, bamboo fiber, cellulose fiber, kenaf fiber and vinylon fiber. Among these preferred is glass fiber.

For binding the fiber, a binder may be used. Examples of the binder include polyolefin resin, polyurethane resin, polyesterresin, acrylicresin, epoxyresin, starch andvegetable oil. In addition, a lubricant such as acid-modified polyolefin resin, a surface treating agent and paraffin wax may be incorporated.

When fiber is used as filler (D), the fiber may be processed with a surface treating agent prior to use thereof for the purpose of improving wettability or adhesiveness between the fiber and polyolefin resin (A). Examples of the surface-treating agent include silane coupling agents, titanate coupling agents, chromium coupling agents, zirconium coupling agents and borane coupling agents. Silane coupling agents and titanate coupling agents are preferable and silane coupling agents are particularly preferable.

Examples of the silane coupling agents include triethoxysilane, vinyltris(β-methoxyethoxy)silane, γ-methacryloxypropyltrimethoxysilane, γ-glycidoxypropyltrimethoxysilane, β-(3,4-epoxycyclohexyl)ethyltrimethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane. Among these preferred are aminosilanes such as γ-aminopropyltriethoxysilane and N-β-(aminoethyl)-γ-aminopropyltrimethoxysilane.

The method for treating the fiber with a surface treatment agent may be methods conventionally employed, for example, the aqueous solution method, the organic solvent method and the spray method.

When fiber is used as filler (D), the weight average fiber length of the fiber is preferably 2 mm or more, and more preferably from 3 to 50 mm from the viewpoints of improvement in mechanical strength such as rigidity and impact strength and ease of manufacture and processing of compositions. The weight average fiber length used herein is determined by the measuring method disclosed In Japanese Patent Application Publication No. 2002-5924.

The content of filler (D) contained in the polyolefin resin composition of the present invention is from 1 to 400 parts by weight, preferably from 1 to 200 parts by weight, and more preferably from 5 to 100 parts by weight per 100 parts by weight 6 of polyolefin resin (A). If the content of filler (D) is over 400 parts by weight, it may be difficult to produce or mold polyolefin resin compositions.

Component (E) for use in the present invention, that is, the polyolefin resin which has been graft-modified with a compound selected from the group consisting of unsaturated carboxylic acids and their derivatives, which is referred hereinafter to as modified polyolefin resin (E), is incorporated for the purpose of improving dispersibilities of pigment and filler to be incorporated into polyolefin resin (A) or adhesiveness between polyolefin resin (A) and filler. In particular, when filler (D) is glass fiber, modified polyolefin resin (E) can improve the adhesive strength between polyolefin resin (A) and the glass fiber to increase the mechanical strength, resulting in a great effect.

Modified polyolefin resin (E) is one obtained by heating a polyolefin resin together with a compound selected from the group consisting of unsaturated carboxylic acids and their derivatives to make them undergo reaction (grafting modification) The polyolefin resin to be used may be either the same as or different from polyolefin resin (A) used in the present invention. Modified polyolefin resin(E) is preferably a modified polypropylene resin from the viewpoint of heat resistance.

The amount of structural units derived from compounds selected from the group consisting of unsaturated carboxylic acids and their derivatives contained in modified polyolefin resin (E), which amount is hereinafter referred to as "graft amount", is typically 0.3% by weight or more, preferably from 0.3 to 20% by weight, more preferably from 0.4 to 20% by weight, and even more preferably from 0.5 to 10% by weight from the viewpoint of durability of mechanical strength. The graft amount is a value obtained by measuring the absorption, in an infrared absorption spectrum of the modified polyolefin resin (E), based on the compound selected from the group consisting of unsaturated carboxylic acids and their derivatives used for the modification.

The graft efficiency of the compound selected from the group consisting of unsaturated carboxylic acids and their derivatives in the modified polyolefin resin is 0.8 or more from the viewpoint of durability of mechanical strength.

The graft efficiency of the compound selected from the group consisting of unsaturated carboxylic acids and their derivatives is a ratio of the amount of the compound selected from the group consisting of unsaturated carboxylic acids and their derivatives actually consumed in the graft reaction to the overall amount of the compound selected from the group consisting of unsaturated carboxylic acids and their derivatives actually fed during the production of the modified polyolefin resin.

Examples of the compound selected from the group consisting of unsaturated carboxylic acids and their derivatives include (1) compounds having in one molecule both (i) at least one kind of unsaturated group and (ii) a group derived from a carboxylic acid group and/or a group derived from carboxylic acid, and (2) compounds having a structure capable of changing to a structure having in one molecule both (i) at least one kind of unsaturated group and (ii) at least one kind of group derived from a carboxylic acid group and/or a group derived from carboxylic acid through a structural change caused by dehydration or the like occurring during the production process.

The at least one unsaturated group (i) may be a carbon-carbon double bond or a carbon-carbon triple bond. Examples of (ii) at least one kind of group derived from a carboxylic acid group and/or a group derived from carboxylic acid include a carboxylic acid group, various salts esters resulting from substitution of the hydrogen atom or the hydroxyl group in a carboxyl group, acid amide, acid anhydride, imide, acid azide and acid halide.

Examples of (1) compounds having in one molecule both (i) at least one kind of unsaturated group and (ii) a group derived from a carboxylic acid group and/or a group derived from carboxylic acid include unsaturated carboxylic acids, derivatives of unsaturated carboxylic acids, and compounds capable of yielding unsaturated carboxylic acids or their derivatives through dehydration occurring during the process of grafting to polyolefin resin.

Examples of the unsaturated carboxylic acids include maleic acid, fumaric acid, itaconic acid, acrylic acid and methacrylic acid. Examples of the derivatives of unsaturated carboxylic acids include maleic anhydride, itaconic acid anhydride, methyl acrylate, ethyl acrylate, butyl acrylate, glycidyl acrylate, methyl methacrylate, ethyl methacrylate, butyl methacrylate, glycidyl methacrylate, maleic acid monoethyl ester, maleic acid diethyl ester, fumaric acid monomethyl ester and fumaric acid dimethyl ester. Among these compounds selected from the group consisting of unsaturated carboxylic acids and their derivatives preferred are glycidyl esters of acrylic acid ormethacrylic acid, and maleic anhydride.

Examples of compounds capable of yielding unsaturated carboxylic acids through dehydration occurring during the process of grafting to polyolefin resin include citric acid and malic acid.

In view of mechanical strength and production stability, the melt flow rate (MFR) of modified polyolefin resin (E) is typically 400 g/10 min or less, preferably from 5 to 400 g/10 min, more preferably from 10 to 300 g/10 min, and even more preferably from 20 to 250 g/10 min, The MFR is determined at 230° C. under a load of 21.2 N in accordance with ASTM D1238.

Modified polyolefin resin (E) is produced by a method in which a polyolefin resin is graft modified a compound selected from the group consisting of unsaturated carboxylic acids and their derivatives. It may also be produced by use of an organic peroxide for increasing the efficiency of grafting reaction.

Examples of the organic peroxide include alkyl peroxides, diacyl peroxides, peroxyesters and peroxycarbonates.

Examples of the alkyl peroxides include dicumyl peroxide, di-tert-butyl peroxide, 2,5-dinethyl-2,5-di(tert-butylperoxy ) hexane, 2,5-dimethyl-2,5-di(tert-butylperoxy)hexyne-3, tert-butyl cumyl peroxide, 1,3-bis(tert-butylperoxyisopropyl) benzene, and 3,6,9-triethyl-3,6,9-trimethyl-1,4,7-triperoxononane.

Examples of the diacyl peroxides include benzoyl peroxide, lauroyl peroxide and decanoyl peroxide.

Examples of the peroxyesters include 1,1,3,3-tetramethylbutyl peroxyneodecanoate, α-cumyl peroxyneodecanoate, tert-butylperoxyneodecanoate, tert-butyl peroxyneoheptanoate, tert-butyl peroxypivalate, tert-hexyl peroxypivalate, 1,1,3,3-tetramethylbutyl peroxy-2-ethylhexanoate, tert-anyl peroxy-2-ethylhexanoate, tert-butyl peroxy-2-ethylhexanoate, tert-butyl peroxyisobutyrate, di-tert-butyl peroxyhexahydroterephthalate, tert-amyl peroxy-3,5,5-trimethylhexanoate, tert-butyl peroxy-3,5.5-trimethylhexanoate, tert-butyl peroxyacetate, tert-butyl peroxybenzoate, and di-t-butyl peroxytrimethyladipate.

Examples of the peroxycarbonates include di-3-methoxybutyl peroxydicarbonate, di(2-ethylhexyl) peroxydicarbonate, diisopropyl peroxydicarbonate, tert-butyl peroxylsopropylcarbonate, di(4-tert-butylcyclohexyl) peroxydicarbonate, dicetyl peroxydicarbonate, and dimyristyl peroxydicarbonate.

Modified polyolefin resin (E) may be prepared by known methods conventionally used for mixing resin and another resin or mixing resin and solid or liquid additives. Preferably, it may be prepared by a method in which all ingredients are mixed or some of the ingredients are separately mixed in combination to form a homogeneous mixture and the mixture is then melt kneaded. The method for preparing a uniform mixture may be a method of mixing materials by means of a mixing device such as a Henschel mixer and a ribbon blender. The method for melt-kneading may be a method of melt-kneading materials by means of a mixing device such as a Banbury mixer, a plastomill, a Brabender plastograph, a single screw extruder and a twin screw extruder.

Since it is possible to produce a composition continuously and, as a result, improve the productivity, preferred is a method in which a mixture obtained by fully premixing a polyolefin resin with a compound selected from the group consisting of unsaturated carboxylic acids and their derivatives and an organic peroxide is fed through a port of a single or twin screw extruder and the mixture is melt-kneaded therein.

For increasing the graft amount and inhibiting the decomposition of polyolefin resin, the temperature of the section of a kneading device where the kneading is carried out (for example, in an extruder, the cylinder temperature) is typically from 50 to 300° C., preferably from 100 to 250° C. Regarding the temperature of the section of a kneading device where the kneading is carried out, the kneading process may be divided into the first and second halves wherein the temperature at the second half is set higher than that of the first half.

For achieving a sufficient graft amount and inhibiting the decomposition of polyolefin resin, the kneading time is typically from 0.1 to 30 minutes and preferably from 0.5 to 5 minutes.

During the preparation of modified polyolefin resin (E), conventional additives which are generally added to polyolefin resin, such as antioxidant and neutralizing agent, may be added.

The content of modified polyolefin resin (E) is typically from 0.1 to 50 parts by weight, preferably from 1 to 30 parts by weight, and more preferably from 2 to 10 parts by weight per 100 parts by weight of polyolefin resin (A).

If the content of modified polyolefin resin (E) is less than 0.1 part by weight, the dispersibility of pigment or filler may be insufficient and also the mechanical strength may be insufficient due to weak adhesiveness between filler and polyolefin resin. If it is over 50 parts by weight, the molding processability may be poor and the mechanical strength may be deteriorated contrary to expectations.

When the polyolefin resin composition of the present invention contains both filler (D) and modified polyolefin resin (E) as well as components (A)-(C), the combined amount of the filler (D) and the modified polyolefin resin (E) per 100 parts by weight of the polyolefin resin (A) is typically from 1 to 400 parts by weight, preferably from 200 parts by weight or less and the weight ratio of component (D) to component (E) is from 100/1 to 5/1. and preferably from 50/1 to 10/1.

The polyolefin resin composition of the present invention may, if necessary, include polymeric materials, such as resin and rubber, other than the polyolefin resins used in the present invention.

Examples of such additional polymeric materials include thermoplastic resins such as ethylene/α-olefin elastomers, polystyrenes (e.g. polystyrene and poly(p-methylstyrene), poly(α-methylstyrene), AS (acrylonitrile/styrene copolymer) resin, ABS (acrylonitrile/butadiene/styrene copolymer) resin, AAS (special acrylic rubber/acrylonitrile/styrene copolymer) resin, ACS (acrylonitrile/chlorinated polyethylene/styrene copolymer) resin, polychloroprene, chlorinated rubber, polyvinyl chloride, polyvinylidene chloride, acrylic resin, ethylene/vinyl alcohol copolymer resin, fluororesin, polyacetal, grafted polyphenylene ether resin, polyphenylene sulfide resin, polyurethane, polyamide, polyester resin (e.g. polyethylene terephthalate and polybutylene terephthalate), polycarbonate, polysulfone, polyether ether ketone, polyether sulfone and aromatic polyester resin; epoxy resin, diallyl phthalate prepolymer, silicone resin, silicone rubber, polybutadiene, 1,2-polybutadiene, polyisoprene, styrene/butadiene copolymer, butadiene/acrylonitrile copolymer, epichlorohydrin rubber, acrylic rubber and natural rubber. These additional resins may be used solely or in combination.

In addition, the polyolefin resin composition of the present invention may, if necessary, include other additives which are generally added to polyolefin resin.

Examples of such additives include nucleating agent, crystallization accelerator, clarifier (agent for increasing transparency), foam inhibitor, flame retardant, flame retarding aid, dispersing agent, antistatic agent, processing aid, lubricant, antifungus agent, organic peroxide, colorant except carbon black such as dye and pigment, plasticizer and foaming agent, photocatalyst such as titanium oxide. These additives may be used solely or in combination.

The polyolefin resin composition including component (A)-(C) of the present invention may be prepared by a method including step (1) or step (2) provided below:

step (1): a step of mixing component (A), component (B) and component (C) at the same time;

step (2): a step of mixing components (A)-(C) separately in at least two stages.

The polyolefin resin composition including component (A)-(C) of the present invention may be prepared by conventional methods, for example, a method in which carbon black (B), stabilizer (C) and, if necessary, other additives or resins are added to polyolefin resin (A) and then the mixture is melt-kneaded to yield pellets, and a method in which the ingredients are melt-kneaded in the presence or absence of organic peroxide In a melt extruder, a Banbury mixer or the like and the resulting mixture is shaped into pellets or the like.

When the polyolefin resin composition of the present invention is produced by a method including the step (2). that is, the step of mixing components (A)-(C) separately in at least two stages, the method may, for example, be (1) a method in which components (B) and (C) are mixed together in advance and then component (A) is mixed with the mixture.

(2) a method In which components (A) and (C) are mixed together in advance and then component (B) is mixed with the mixture, or (3) a method in which components (A) and (B) are mixed together in advance and then component (C) is mixed with the mixture.

When the polyolefin resin composition of the present invention is produced by a method including the step (2), that is, the step of mixing components (A)-(C) separately in at least two stages, the proportions of ingredients in a mixture composed of two firstly mixed ingredients may be determined at will so that the amounts of the ingredients will finally be adjusted successfully within the prescribed ranges in the polyolefin resin composition of the present invention. The mixture of the two firstly mixed ingredients is preferably in powdery, granular or pellet form.

The polyolefin resin composition including filler (D) and/or modified polyolefin resin (E) in addition to components (A)-(C) may be prepared by a method including step (3) or step (4) provided below:

step (3): a step of mixing a polyolefin resin composition including components (A)-(C) with component (D) and/or component (E) at the same time;

step (4): a step of mixing a polyolefin resin composition including components (A)-(C) with component (D) and/or component (E) separately in at least two stages.

Specifically, the polyolefin resin composition including components (A)-(C) and also component (D) and/or component (E) may be prepared, for example, by a method in which filler (D) and/or modified polyolefin resin (E) and, if necessary, other additives or resins are added to a polyolefin resin composition composed of components (A)-(C) and then the mixture is melt-kneaded and shaped into pellets or the like, or a method in which the ingredients are melt-kneaded in the presence or absence of organic peroxide in a melt extruder, a Banbury mixer or the like and then pelletized.

When filler (D) is long fiber, a method by which it is possible to incorporate fiber into polyolefin resin (A) without allowing the fiber to be broken is used preferably for increasing the mechanical strength of a resulting polyolefin resin composition. In particular, a polyolefin resin composition including, as filler (D), long fiber with a length of 2 mm or more is preferably produced by the pultrusion method, which is disclosed for example in Japanese Patent Application Publication No. 3-121146.

When the polyolefin resin composition of the present invention including components (A)-(C) and also component (D) and/or component (E) is produced by a method including the step (4), that is a step of mixing a polyolefin resin composition including components (A)-(C) with component (D) and/or component (E) separately in at least two stages, the method may, for example, be (4) a method in which components (D) and (E) are mixed together in advance and then the resulting mixture is mixed with a polyolefin resin composition including components (A)-(C).

(5) a method in which a polyolefin resin composition including components (A)-(C) and component (E) are mixed together and then component (D) is mixed with the resulting mixture, or (6) a method in which a polyolefin resin composition including components (A)-(C) and component (D) are mixed together and then component (E) is mixed with the resulting mixture.

When the polyolefin resin composition of the present invention is produced by a method including the step (4), that is, the step of mixing a polyolefin resin composition including components (A)-(C) with component (D) and/or component (E) separately in at least two stages, the proportions of ingredients in a mixture composed of two or more firstly mixed ingredients may be determined at will so that the amounts of the ingredients will finally be adjusted successfully within the prescribed ranges in the polyolefin resin composition of the present invention. The mixture of the firstly mixed ingredients is preferably in powdery, granular or pellet form.

The method for preparing a uniform mixture composed of the ingredients of the polyolefin resin composition of the present invention may, for example, be a method of mixing the ingredients by means of a mixing device such as a Henschel mixer and a ribbon blender. The inlet-kneading may be carried out by use of a mixing device such as a Banbury mixer, a plastomill, a Brabender plastograph, a single screw extruder and a twin screw extruder.

When filler (D) is fiber, the fiber may be incorporated to polyolefin resin while the fiber is in the form of roving or chopped strands. When the fiber is in the form of roving, the polyolefin resin composition may be produced by a method in which the fiber is impregnated with polyolefin resin by the pultrusion method or the like and thereby long fiber is allowed to be contained in the composition.

The pultrusion method is basically a method in which a continuous fiber bundle is pulled and simultaneously impregnated with resin. Examples thereof include:

(7) a method in which a fiber bundle is passed through an impregnation bath containing an emulsion, suspension or solution of the resin and, thereby, the resin is impregnate into the bundle;

(8) a method in which a powder of resin is sprayed to a fiber bundle and then is melted and allowed to impregnate into the bundle;

(9) a method in which a fiber bundle is passed through a bath containing a powder of resin, so that the resin is attached to the fiber, and then the resin is melted and allowed to impregnate into the fiber; and

(10) a method in which while a fiber bundle is passed through a crosshead, resin is fed into the crosshead from an extruder or the like and, thereby, the resin is allowed to impregnate into the fiber.

Preferred is a method using across head, which is disclosed, for example, in Japanese Patent Application Publication No. 3-272830. In the pultrusion method, the impregnation of the fiber bundle with resin may be carried out either in a single step or in two or more separate steps.

A polyolefin resin composition of the present invention may be in any form. For example, it may be in strand form, sheet form, flat plate form, or pellet form obtained by cutting a strand into an appropriate length. A polyolefin resin composition which is used for injection molding is preferably in pellet form having a length of from 2 to 50 mm from the viewpoint of the mechanical strength of resulting molded articles and production stability during the molding process.

The molded article of the present invention is an article obtained by molding a polyolefin resin composition of the present invention. The molded article of the present invention may have any shape and size.

The molded article of the present invention may be produced by, for example, injection molding, press molding, vacuum molding, expansion molding or extrusion forming, which are conventionally used in industrial manufacture. Moreover, a method in which a polyolefin resin composition and a similar or different type of resin are laminated or coextrusion forming may also be used.

The molded article of the present invention is preferably an injection-molded article obtained by injection molding.

The injection molding includes methods conventionally used in industrial manufacture, for example, injection molding, injection foam molding, super critical injection foam molding, ultrahigh speed injection molding, injection compression molding, gas-assist injection molding, sandwich molding, sandwich foam molding, and insert/outsert molding.

As a molded article obtained by injection molding a polyolefin resin composition including long fiber, a molded article including fibers having a weight average fiber length of 1 mm or more is preferred because it can maintain its mechanical strength at high level.

Applications of the molded article of the present invention include automotive components, household electric appliances. OA equipment, building or construction materials, drainage equipment, toiletry materials, tanks, containers and sheeting.

Examples of the automotive components include interior components such as door trims, pillars, instrument panels, consoles, locker panels, arm rests, door inner panels and spare tire cover; exterior components such as bumpers, spoilers, fenders, side steps and door outer panels; other components such as air-intake ducts, coolant reserve tanks, radiator reserve tanks, window washer tanks, fender liners and fans; and integrated components such as front end panels.

Examples of household electric appliances include components of clothes washers (outer tank, inner tank, lid, pulsator, balancer, etc. ), drying machine components, vacuum cleaner components, rice cooker components, electric pot components, heat insulator components, dish washer components and air cleaner components.

Examples of OA equipment and media-related materials include cases of magnetic storage media and optical storage media, components of personal computer and printer components.

Building or construction materials include forms for use for hardening concrete and walls. Drainage equipment includes pipes and pump components. Containers include containers for food packaging, transport containers and clothes containers.

Preferable applications of the molded article of the present invention are automotive components, household electric appliances, building or construction materials, drainage equipment and containers.

EXAMPLES

Hereinafter, the present invention is described by making reference to Examples and Comparative Examples, which do not limit the scope of the present invention in any way.

Polyolefin resins (component (A)), carbon blacks (component (B)), stabilizers (component (C)), fillers (component (D)) and modified polyolefin resins (component (E)) used in examples and comparative examples are shown below.

(1) Component (A): Polyolefin Resin

A mixture of the propylene homopolymers listed below was used.

(A-1) Sumitomo NOBLEN U501E1 manufactured by Sumitomo Chemical Co., Ltd. (propylene homopolymer)

(1) MFR (230° C., load 21.2 N): 120 g/10 min.

(2) Melting point: 164° C.

(3) Isotactic index [mmmm]: 0.97

(A-2) Sumitomo NOBLEN Z101A manufactured by Sumitomo Chemical Co., Ltd. (propylene homopolymer)

(1) MFR (230° C., load 21.2 N): 23 g/10 man.

(2) Melting point: 165° C.

(3) Isotactic index [mmmm]; 0.97

(A-3) Polypropylene powder (propylene homopolymer)

(1) MFR (230° C. load 21.2 N): 23 g/10 min.

(2) Melting point: 164° C.

(3) Isotactic index [mmmm]: 0.97

(2) Component (B): Carbon Black (B-1) Carbon black having volatile matter content of 0.04% by weight and an overall metal content of 2 ppm (B-2) Carbon black having volatile matter content of 0.89% by weight and an overall metal content of 6 ppm Volatile matter content (t by weight); The weight percent of the volatile matter determined by the method prescribed in JIS K6221.

Metal content (ppm): The total of the contents of all element (s) selected from the group consisting of iron, nickel, copper, cobalt, aluminum, manganese and vanadium determined by the ICP emission spectrometry (inductively coupled high-frequency plasma emission spectrometry).

(3) Component (C): Stabilizer.

C-1: Phenol antioxidant

Sumilizer GA80 manufactured by Sumitomo Chemical Co., Ltd. [Chemical Name: 3,9-Bis[1,1-dimethyl-2-(β-(3-tert-butyl-4-hydroxy-5-methylphenyl]propionyloxy)ethyl]-2,4,8,10-tetraoxaspiro[5,5]undecanel C-2: phosphorus-containing antioxidant ADK STAB PEP-240 manufactured by Asahi Denka Co., Ltd. [Chemical Name: Bis(2, 4-di-tert-butylphenyl)pentaerythritol diphosphite]

C-3: sulfur-containing antioxidant

Sumilizer TPM manufactured by Sumitomo Chemical Co., Ltd. [Chemical Name: Dimyristyl thiodipropionate]

C-4: Phenol antioxidant

Irganox 1010 manufactured by Ciba Specialty Chemicals: [Chemical Name: Tetrakis[methylene-3-(3',5'-di-tert-butyl-4-hydroxyphenyl)propionate]methane]

C-5: phosphorus-containing antioxidant

Irgaphos 168 manufactured by Ciba Specialty Chemicals: [Chemical Name: Tris(2, 4-di-tert-butylphenyl)phosphite]

C-6: hindered amine light stabilizer

SANOL LS770 manufactured by Sankyo Co., Ltd. [Chemical Name: Bis(2,2,6,6-tetramethyl-4-piperidyl) sebacate]

(4) Component (D); Filler (D-1)

(1) Fiber diameter of glass fiber; 16 μm (2) Length of glass fiber: 9 mm (equal to pellet length)

Pellets (long fiber-containing polyolefin resin composition) including 40% by weight of the long glass fiber whose particulars are shown above were used in examples. The preparation of the pellets is shown below.

[Preparation of Long Fiber-Containing Polyolefin Resin Composition]

A long fiber-containing polyolefin resin composition was prepared in accordance with the method described in Japanese Patent Application Publication No. 3-121146. Long fiber glass-containing pellets having a length in the major axis direction of 9 mm were produced at an impregnation temperature of 270° C. and a drawing speed of 33 feet/min.

(5) Component (E): Modified Polyolefin Resin (E-1)

Used was a modified polyolefin resin prepared by the method described in Japanese Patent Application Publication No. 2002-308947. Characteristic properties of the modified polyolefin resin are shown below.

(1) Species: propylene-(ethylene-propylene) block copolymer Content of (ethylene-propylene) random copolymer=21% by weight (2) MFR (230° C., load 21.2 N): 60 g/10 min (3) Graft amount of maleic acid: 0.6% by weight The methods for evaluating the raw materials used in examples and comparative examples are shown below.

(1) MFR (g/10 min.)

MFR was measured under the following conditions per ASTM D1238.

Measuring temperature: 230° C.

Load: 21.2 N (2) Melting Point (° C.)

A melting point was measured by means of a differential scanning calorimeter (DSC-VII manufactured by PerkinElmer, Inc.) by melting a sample (10 mg) at 220° C. for five minutes under anitrogen atmosphere, crystallizing the molten sample by cooling to 50° C. at a cooling rate of 5° C./min, and then heating the crystallized sample at a rate of 5° C./min. The highest peak in the resulting fusion endothermic curve was defined as the melting point of the sample.

(3) Isotactic Index [mmmm]

The isotactic index is a fraction of isotactic chains in the form of pentad unit in a polypropylene molecule chain, in other words, a fraction of propylene monomer units existing in the center of a chain in which five propylene monomer units are meso-bonded, measured by a method using $^{13}$C-NMR described by A. Zambelli, et al. in Macromolecules 6,925 (1973). The fraction is called; isotactic pentad fraction and it is expressed by [mmmm]. The assignment of absorption peaks in an NMR spectrum was soared out according to the article of Macromolecules 8, 687 (1975). Specifically, the isotactic index of a polypropylene resin was determined as an area fraction of mmmm peaks in all the absorption peaks in the methyl carbon region of a $^{13}$C-NMR spectrum. The measurement was carried out by use of AM400 manufactured by BRUKER.

(4) Graft Amount of Maleic Acid in Modified Polyolefin Resin (% by Weight)

A sample (1.0 g) was dissolved in 100 ml of xylene. The sample solution was dropped into 1000 ml of methanol under stirring. Thus, the sample was reprecipitated and recovered. (Hereinafter, the operations from the dissolution to the recovery are collectively called "purification".) The purified sample was subjected to vacuum drying (at 80° C. for 8 hours) and then to hot pressing. Thus, a film having a thickness of 100 μm was prepared, The infrared absorption spectrum of the so-prepared film was measured and the graft amount of maleic anhydride was determined on the basis of the absorption in the vicinity of 1780 cm$^{-1}$.

The methods for preparing and evaluating molded articles for evaluation used in examples and comparative examples are shown below.

(1) Preparation of a Molded Article for Evaluation

Long fiber-containing pellets were subjected to injection molding under the conditions shown below using a molding machine manufactured by The Japan Steel Works, Ltd.

[Molding Machine Manufactured by the Japan Steel Works, Ltd.]

Clamping force: 150 ton

Screw: Screw with deep channel

Screw diameter: 46 mm

Screw L/D ratio: 20.3

[Molding Conditions]

Cylinder temperature: 250° C.

Mold temperature: 50° C.

Back pressure: 0 MPa (2) Appearance

The dispersibility of carbon black was evaluated. Specifically, the presence of color unevenness in the surface of a molded article was visually observed. When no color unevenness was recognized, the result was indicated by "○", whereas when some color unevenness was recognized, the result was indicated by "×".

(3) Tensile Strength (MPa)

Flexural strength was measured under the following conditions per ASTM D638.

Measuring temperature: 23° C.

Sample thickness: 3.2 mm

Tensile rate: 10 mm/min.

(4) Flexural Modulus (MPa)

Flexural modulus was measured under the following conditions per ASTM D790.

Measuring temperature; 23 C.

Sample thickness: 6.4 mm

Span: 100 mm

Speed; 2 mm/min.

(5) Flexural Strength (MPa)

Flexaral strength was measured under the following conditions per ASTM D790.

Measuring temperature: 23° C.

Sample thickness: 6.4 mm

Span: 100 mm

Speed: 2 mm/min.

(6) IZOD Impact Strength (kJ/m$^2$)

IZOD impact strength was measured under the following conditions per ASTM D256.

Measuring temperature: 23° C.

Sample thickness: 6.4 mm [V-notched]

(7) Durability Test (7-1) Thermal Degradation Resistance

The thermal degradation resistance was evaluated in accordance with JIS K7212 [General rules for tests for thermal ageing properties of thermoplastics in the form of sheet by means of ovens]. In a gear oven (manufactured by Toyo Seiki Seisaki-Sho Co., Ltd.) set to 150° C., a specimen was heat-treated.

[Measurement of Strength]

A specimen having been heat-treated for 1000 hours was measured for its strength. The less the decrease in tensile strength during the heat treatment, the better the thermal degradation resistance.

[Measurement of Ageing Life]

The time required before the surface of the specimen was deteriorated through heat treatment (ageing life) was measured. The ageing life was defined as a time required before the occurrence of color change in the surface of a round specimen 25 mm in diameter and 3 mm in thickness due to degradation of the specimen.

(7-2) Copper-Accelerated Thermal Degradation Resistance

A test was carried out in the same manner as that used in (7-1) thermal degradation resistance test except that a specimen was heat treated in a gear oven while being sandwiched between copper plates (thickness: 1 mm) so that the both sides of the specimen were entirely covered with the copper plates. The specimen having been heat-treated was measured for its strength. The less the decrease in tensile strength during the heat treatment, the better the copper-accelerated thermal degradation resistance.

(7-3) Light Stability

Using a sunshine weather meter (Model WEL-SUN-DCH, manufactured by Suga Test Instruments Co., Ltd.), a light stability test was carried out under conditions: irradiance: 255 (W/m$^2$), blackpanel temperature 63° C., raining (raining cycle: 18/120 min). The specimen after a 500-hour exposure was measured for its strength. The less the decrease in tensile strength during the exposure or the higher the retention of surface gloss, the better the light stability.

The surface gloss was measured by means of a precision gloss meter manufactured by Murakami Color Research Laboratory Co., Ltd. (Model GM-3D, angle: 60°) in accordance with JIS Z8741 (1997)

Example 1

(1) Preparation of Carbon Black-Containing Mixture (Color Masterbatch: MB-1)

A mixture composed of 42% by weight of carbon black (B-1) having a volatile matter content of 0.04% by weight and a total content of specific metal components of 2 ppm and 58% by weight of Sunwax 165P (manufactured by Sanyo Chemical Industries Ltd.), which is a low molecular weight polyethylene wax, was melt-kneaded at 130° C. for 20 minutes in a butterfly mixer with jacket and then was kneaded and dispersed by means of a three-roll mill at a heating temperature of 130° C. The resulting kneaded dispersion was cooled to room temperature and then crushed into granules, which are herein after referred to collectively as color master powder.

Subsequently, a mixture composed of 71.5% by weight of the color master powder mentioned above and 28.5% by weight of a polypropylene resin, namely propylene-(ethylene-propylene) block copolymer "Sumitomo NOBLEN AZ864" manufactured by Sumitomo Chemical Co., Ltd., was stirred in a tumbler for 30 minutes, After that, the mixture was melted and pelletized by use of a twin screw extruder (TEM-35B manufactured by Toshiba Machine Co., Ltd.) at a cylinder temperature of 200° C. Thus, a color masterbatch (MB-1) having a carbon black content of 30% by weight was obtained.

(2) Preparation of Long Fiber-Containing Polyolefin Resin Composition

A long fiber-containing polyolefin resin composition was prepared in accordance with the method described in Japanese Patent Application Publication No. 3-121146. Long fiber glass-containing pellets having a length in the major axis direction of 9 mm were produced at an impregnation temperature of 270° C. and a drawing speed of 33 feet/min.

The blend composition is shown below.

Polyolefin Resin:
 Polyolefin resins (A-1)=43% by weight
 Polyolefin resins (A-2)=15% by weight
 (Total: 58% by weight)

Filler:
 Glass fiber (D-1) -40% by weight

Modified Polyolefin Resin:
 Modified polyolefin resin (E-1)=2% by weight Stabilizer: the following stabilizers were blended for 100 parts by weight, in total, of components (A-i), (A-2), (D-1) and (E-1):
 C-1: 0.1 part by weight (0.17 part by weight for 100 parts by weight of component (A))
 C-2: 0.1 part by weight (0.17 part by weight for 100 parts by weight of component (A))
 C-3: 0.3 part by weight (0.52 part by weight for 100 parts by weight of component (A))

(3) Production of a Molded Article Composed of a Color Polyolefin Resin Composition The color masterbatch (MB-1) prepared in (1) of Example 1 and the long fiber-containing polyolefin resin composition prepared in (2) of Example 1 were mixed in the blend proportions given in Table 1. Using this mixture, molded articles (specimens) for use in physical property measurements were produced by use of an injection molding machine. The specimens were subjected to physical property measurements and long-term durability tests. The results are shown in Table 2.

Example 2, 3

Molded articles (specimens) composed of a color polyolefin resin composition were produced in the same manner as that disclosed in Example 1 except changing the amount of color masterbatch (MB-1) (amount of carbon black) as shown in Table 1. The specimens were subjected to physical property measurements and long-term durability tests. The results are shown in Table 2.

Comparative Example 1

(1) Preparation of Carbon Black-Containing Mixture (Color Masterbatch: MB-2)

Color masterbatch (MB-2) having a carbon black content of 13% by weight was prepared in the same manner as that described (1) of Example 1 except using carbon black (B-2) having a volatile matter content of 0.89% by weight and a total content of specific metal components of 6 ppm.

(2) Preparation of Long Fiber-Containing Polyoleein Resin Composition

The composition the same as that disclosed in (2) of Example 1 was used.

(3) Production of a Molded Article Composed of a Color Polyolefin Resin Composition The color masterbatch (MB-2) prepared in (1) of Comparative Example 1 and the long fiber-containing polyolefin resin composition prepared in (2) of Comparative Example 1 were mixed in the blend proportions given in Table 1. Using this mixture, molded articles (specimens) for use in physical property measurements were produced by use of an Injection molding machine The specimens were subjected to physical property measurements and long-term durability tests. The results are shown in Table 2.

Comparative Example 2

Molded articles (specimens) composed of a color polyolefin resin composition were produced in the same manner as that disclosed in Comparative example 1 except changing the amount of color masterbatch (MB-2) (amount of carbon black) as shown in Table 1. The specimens were subjected to physical property measurements and long-term durability tests. The results are shown in Table 2.

TABLE 1

|  | Example | | | Comparative Example | |
|---|---|---|---|---|---|
|  | 1 | 2 | 3 | 1 | 2 |
| (B) Color MB | | | | | |
| Kind | MB-1 | MB-1 | MB-1 | MB-2 | MB-2 |
| Amount (parts by weight) | 0.4 | 1.0 | 3.0 | 1.0 | 2.0 |
| Final CB Amount (parts by weight) | 0.12 | 0.3 | 0.4 | 0.13 | 0.26 |
| (A), (C), (D) and (E) were added at the same time | | | | | |
| (A) Polyolefin resin | | | | | |
| Kind | A-1/A-2 | A-1/A-2 | A-1/A-2 | A-1/A-2 | A-1/A-2 |
| Amount (parts by weight) | 43/15 | 43/15 | 43/15 | 43/15 | 43/15 |
| (C) Stabilizer (parts by weight) Note 1 | | | | | |
| C-1 | 0.1 | 0.1 | 0.1 | 0.1 | 0.1 |
| C-2 | 0.1 | 0.1 | 0.1 | 0.1 | 0.1 |
| C-3 | 0.3 | 0.3 | 0.3 | 0.3 | 0.3 |
| (D) Filler | | | | | |
| Kind | D-1 | D-1 | D-1 | D-1 | D-1 |
| Amount (parts by weight) | 40 | 40 | 40 | 40 | 40 |
| (E) Modified polyolefin resin | | | | | |
| Kind | E-1 | E-1 | E-1 | E-1 | E-1 |
| Amount (parts by weight) | 2 | 2 | 2 | 2 | 2 |

Note 1:
Amount for 100 parts by weight, in total, of components (A), (D) and (E).
Amount for 100 parts by weight of polyolefin resin (A): C-1 = 0.17 part by weight, C-2 = 0.17 part by weight, C-3 = 0.52 part by weight

TABLE 2

|  | Example | | | Comparative Example | |
|---|---|---|---|---|---|
|  | 1 | 2 | 3 | 1 | 2 |
| <<Appearance>> | | | | | |
| Pigment dispersibility | ◯ | ◯ | ◯ | ◯ | ◯ |
| <<Initial physical properties>> | | | | | |
| Tensile strength (MPa) | 170 | 161 | 154 | 151 | 149 |
| Flexural modulus (MPa) | 7780 | 7770 | 7520 | 7320 | 7290 |
| Flexural strength (MPa) | 171 | 171 | 164 | 165 | 161 |
| IZOD Impact strength (kJ/m$^2$) | 32 | 28 | 28 | 31 | 26 |
| <<Long-term durability>> | | | | | |
| Thermal degradation resistance Tensile strength (MPa) after 1000 h | 146 | 139 | 135 | 18 | 20 |

TABLE 2-continued

|  | Example | | | Comparative Example | |
|---|---|---|---|---|---|
|  | 1 | 2 | 3 | 1 | 2 |
| Copper-accelerated thermal degradation resistance Tensile strength (MPa) after 1000 h | 136 | 144 | 125 | 37 | 31 |
| Light stability Tensile strength (MPa) after 500 h | 157 | 157 | 153 | 138 | 132 |

Example 4

As shown in Table 3, stabilizers (C-1) and (C-5) in an amount of 0.1 part by weight each were added to 100 parts by weight of polyolefin resin (A-3). Mixing was continued for five minutes by use of a Henschel mixer. The resulting mixture was melt-kneaded under conditions including a preset temperature of 230° C. by means of a single screw extruder (manufactured by Tanabe Plastic Machine Co., Ltd. ) having an inner diameter of 40 mm. Thus, pellets composed of the composition were yielded. One part by weight of color masterbatch (MB-1) disclosed in Example 1 was blended to 100 parts by weight of the pellets and then molded articles (specimens) for evaluations were produced by use of an injection molding machine. The carbon black content in the molded articles was 0.3 part by weight per 100 parts by weight of polyolefin resin (A-3). Using the molded articles, appearance, tensile strength and long-term durability were evaluated. The results are shown in Table 3.

Examples 5, 6

In the same manner as that used in Example 4 except the stabilizers were changed as shown in Table 3, molded articles (specimens) were produced and evaluated. The results are shown in Table 3.

Comparative Example 3

In the same manner as that used in Example 4 except that 2.3 parts by weight of color masterbatch (MB-2) was blended in place of (MB-1) used in Example 4, molded articles (specimens) were produced and evaluated. The carbon black content in the molded articles was 0.3 part by weight per 100 parts by weight of polyolefin resin (A-3). Using the molded articles, appearance, tensile strength and long-term durability were evaluated. The results are shown in Table 3.

Comparative Examples 4, 5

In the same manner as that used in Comparative Example 3 except the stabilizers were changed as shown in Table 3, molded articles (specimens) were produced and evaluated. The results are shown in Table 3.

TABLE 3

|  | Example | | | Comparative Example | | |
|---|---|---|---|---|---|---|
|  | 4 | 5 | 6 | 3 | 4 | 5 |
| (A) Polyolefin resin | | | | | | |
| Kind | A-3 | A-3 | A-3 | A-3 | A-3 | A-3 |
| Amount (parts by weight) | 100 | 100 | 100 | 100 | 100 | 100 |
| (B) Color MB | | | | | | |
| Kind | MB-1 | MB-1 | MB-1 | MB-2 | MB-2 | MB-2 |
| Amount (parts by weight) | 1.0 | 1.0 | 1.0 | 2.3 | 2.3 | 2.3 |
| Final CS Amount (parts by weight) | 0.3 | 0.3 | 0.3 | 0.3 | 0.3 | 0.3 |
| (C) Stabilizer (parts by weight) | | | | | | |
| C-1 (GA80) | 0.1 | | 0.1 | 0.1 | | 0.1 |
| C-4 (Irganox1010) | | 0.1 | | | 0.1 | |
| C-5 (Irgafos168) | 0.1 | 0.1 | 0.1 | 0.1 | 0.1 | 0.1 |
| C-6 (LS770) | | | 0.1 | | | 0.1 |
| <<Appearance>> | | | | | | |
| Pigment dispersibility | ○ | ○ | ○ | ○ | ○ | ○ |
| <<Initial physical properties>> | | | | | | |
| Tensile strength (MPa) | 39.5 | 39.1 | 39.2 | 37.1 | 37.1 | 37.1 |
| <<Long-term durability>> | | | | | | |
| Thermal degradation resistance | | | | | | |
| Tensile strength (MPa) after 500 h | 37.3 | 37.3 | 37.3 | Un-mesure-able | Un-meaure-able | Un-mesure-able |
| Ageing life (h) Light stability | 650 | 580 | 500 | 310 | 310 | 310 |
| Tensile strength (MPa) after 500 h | 38.1 | 37.9 | 38.1 | 36.1 | 36.1 | 36.3 |
| Gloss retention (%) after 500 h | 83.3 | 84.0 | 84.5 | 82.9 | 79.2 | 85.5 |

In Examples 1 through 3, mechanical strength, such as rigidity (tensile strength, flexural modulus, flexural strength) and impact resistance (IZOD impact strength), is high and appearance and long-term durability are excellent.

Contrary to this, in Comparative Examples 1 and 2 where the requirements regarding carbon black are not satisfied, initial strength and long-term durability are insufficient.

In Examples 4 through 6, the tensile strength is high and the thermal degradation resistance and light stability are excellent.

In Comparative Examples 3 through 5 where the requirements regarding carbon black are not satisfied, the tensile strength is low and the thermal degradation resistance is insufficient.

What is claimed is:

1. A polyolefin resin composition comprising component (A) defined below, 0.001 to 10 parts by weight, based on 100 parts by weight of component (A), of component (B) defined below and 0.01 to 100 parts by weight, based on 100 parts by weight of component (A), of component (C) defined below:
   component (A): polyolefin resin, except polyolefin resin which has been graft-modified with a compound selected from the group consisting of unsaturated carboxylic acids and their derivatives;

component (B): carbon black which satisfies requirements (1) and (2) defined below:

requirement (1): containing a volatile component in an amount of less than 0.2% by weight as measured by the method provided in JIS K6221;

requirement (2): containing at least one element selected from the group consisting of iron, nickel, copper, cobalt, aluminum, manganese and vanadium an amount, based on the weight of the carbon black, of 4 ppm or less;

component (C): stabilizer.

2. The composition according to claim 1 further comprising component (D) defined below in an amount of 1 to 400 parts by weight based on 100 parts by weight of component (A):

component (D): filler, except the carbon black of component (B).

3. The composition according to claim 1 further comprising component (E) defined below in an amount of 0.1 to 50 parts by weight based on 100 parts by weight of component (A);

component (E): polyolefin resin which has been graft-modified with a compound selected from the group consisting of unsaturated carboxylic acids and their derivatives.

4. The composition according to claim 1 further comprising components (D) and (E) defined below in a combined amount of components (D) and (E) of 1 to 400 parts by weight based on 100 parts by weight of component (A) wherein the weight ratio of component (D) to component (E) is within the range of from 5/1 to 100/1:

component (D): fillers except the carbon black of component (B);

component (E): polyolefin resin which has been graft-modified with a compound selected from the group consisting of unsaturated carboxylic acids and their derivatives.

5. The composition according to claim 2 wherein component (D) is fiber.

6. The composition according to claim 4 wherein component (D) is fiber.

7. The composition according to claim 2 wherein component (D) is fiber having a weight average fiber length of 2 mm or more.

8. The composition according to claim 4 wherein component (D) is fiber having a weight average fiber length of 2 mm or more.

9. A molded article obtained by molding the composition according to any one of claims 1 to 8.

* * * * *